(12) United States Patent
Chien et al.

(10) Patent No.: US 8,929,848 B2
(45) Date of Patent: Jan. 6, 2015

(54) INTERFERENCE-ROBUST RECEIVER FOR A WIRELESS COMMUNICATION SYSTEM

(75) Inventors: George Chien, Saratoga, CA (US);
Yen-Horng Chen, Taipei (TW);
Chi-Yao Yu, Hsinchu County (TW);
Lan-Chou Cho, Taipei County (TW);
Chih-Chun Tang, Taipei (TW);
Siu-Chuang Ivan Lu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 1235 days.

(21) Appl. No.: 12/612,683

(22) Filed: Nov. 5, 2009

(65) Prior Publication Data

US 2010/0167681 A1 Jul. 1, 2010

Related U.S. Application Data

(60) Provisional application No. 61/141,847, filed on Dec. 31, 2008.

(51) Int. Cl.
*H04B 1/10* (2006.01)
*H04B 1/28* (2006.01)

(52) U.S. Cl.
CPC ... *H04B 1/28* (2013.01); *H04B 1/10* (2013.01)
USPC ............ 455/307; 455/213; 455/284; 455/311

(58) Field of Classification Search
CPC ..... H03F 1/223; H03F 3/211; H03F 3/45188; H03F 3/45475; H03F 3/72; H03F 2203/45386; H03F 2203/7236; H04B 1/28; H04B 1/18; H04B 1/06; H03D 7/1411; H03D 7/166; H03D 7/1458; H03D 7/14662; H03D 7/165; H03D 7/1483; H03D 2200/009; H03D 2200/0023; H03D 2200/0025; H03D 2200/0043; H03D 2200/0088
USPC ......... 455/307, 130, 333, 293, 330, 313–326, 455/334–340, 290, 424, 425, 296, 302, 286, 455/213, 285, 284, 311, 306; 327/113, 116, 327/119, 124, 101; 330/171, 182, 197, 302
See application file for complete search history.

(56) References Cited

U.S. PATENT DOCUMENTS

| 5,678,213 | A | 10/1997 | Myer |
| 6,469,581 | B1 | 10/2002 | Kobayashi |
| 7,076,009 | B2 | 7/2006 | Wieck |

(Continued)

FOREIGN PATENT DOCUMENTS

| CN | 1136243 A | 11/1996 |
| CN | 1361977 A | 7/2002 |

(Continued)

*Primary Examiner* — Pablo Tran
(74) *Attorney, Agent, or Firm* — Winston Hsu; Scott Margo (57) ABSTRACT

An interference-robust receiver includes an RF signal processor, a frequency conversion interface and an analog signal processor. The RF signal processor provides an RF signal. The frequency conversion interface includes a passive mixer for generating an intermediate frequency signal by down-converting an in-band part of the RF signal to a passband of a filter and down-converting an out-of-band part of the RF signal to a stopband of the filter. The filter can thus filter the intermediate frequency signal with the passband and the stopband.

17 Claims, 9 Drawing Sheets

(56) References Cited

U.S. PATENT DOCUMENTS

| | | |
|---|---|---|
| 7,155,196 B1 | 12/2006 | Beard |
| 7,205,846 B1 | 4/2007 | Ding |
| 7,460,844 B2 * | 12/2008 | Molnar et al. ............... 455/130 |
| 7,599,675 B2 * | 10/2009 | Mu et al. .................. 455/240.1 |
| RE41,582 E | 8/2010 | Larson |
| 7,787,847 B2 | 8/2010 | Dijkmans |
| 7,844,233 B2 * | 11/2010 | Vaisanen .................. 455/127.1 |
| 7,890,076 B2 * | 2/2011 | Mattisson et al. ............ 455/323 |
| 7,899,426 B2 * | 3/2011 | Tasic et al. ................. 455/286 |
| 8,018,288 B2 | 9/2011 | Duster |
| 8,019,310 B2 * | 9/2011 | Sahota et al. ............... 455/313 |
| 8,041,327 B2 | 10/2011 | Youssoufian |
| 8,059,571 B2 | 11/2011 | Sen |
| 8,165,556 B2 * | 4/2012 | Molnar et al. ............... 455/313 |
| 8,351,978 B2 | 1/2013 | Tasic |
| 2002/0113656 A1 | 8/2002 | Iwai |
| 2005/0164669 A1 | 7/2005 | Molnar |
| 2006/0079194 A1 | 4/2006 | Tired |
| 2006/0199562 A1 | 9/2006 | Taylor |
| 2007/0111661 A1 * | 5/2007 | Bargroff et al. ............. 455/13.3 |
| 2007/0142019 A1 | 6/2007 | Mattisson |
| 2008/0014896 A1 | 1/2008 | Zhuo |
| 2008/0139149 A1 | 6/2008 | Mu |
| 2008/0284487 A1 | 11/2008 | Pullela |
| 2008/0318518 A1 | 12/2008 | Coutinho |
| 2011/0207420 A1 * | 8/2011 | Rajendran et al. ......... 455/127.1 |

FOREIGN PATENT DOCUMENTS

| | | |
|---|---|---|
| CN | 1897468 A | 1/2007 |
| CN | 1914790 A | 2/2007 |
| CN | 201039094 Y | 3/2008 |
| CN | 101375504 A | 2/2009 |
| EP | 0 715 417 A2 | 6/1996 |
| EP | 0 715 417 A3 | 7/1997 |
| JP | 200496404 A | 3/2004 |
| JP | 2005244397 | 9/2005 |
| JP | 2007522728 A | 8/2007 |
| JP | 2008236135 | 10/2008 |

* cited by examiner

INTERFERENCE-ROBUST RECEIVER FOR A WIRELESS COMMUNICATION SYSTEM

CROSS REFERENCE TO RELATED APPLICATIONS

This application claims the benefit of U.S. Provisional Application No. 61/141,847, filed on Dec. 31, 2008 and entitled "Adaptive receiver with high linearity to receive wideband antenna signal and the method thereof", the contents of which are incorporated herein by reference.

BACKGROUND OF THE INVENTION

1. Field of the Invention

The present invention is related to a receiver for a wireless communication system, and more particularly, to an interference-robust receiver which provides highly linear baseband signal for a wireless communication system.

2. Description of the Prior Art

An important concern when designing radio-frequency (RF) receivers for wireless communication systems is to detect a very weak in-band signal in the presence of a strong out-of-band jammer. If the linearity of the receiver is not good enough, such jammer may saturate the receiver and block the in-band signal. Using a surface acoustic wave (SAW) filter in front of the receiver is the most common solution to this problem. The SAW filter has band-pass capability with a very high quality (Q) factor, thereby capable of providing a large rejection ratio to the out-of-band jammer (normally greater than 20 dB) and meeting the receiver linearity requirement.

Figure 1:
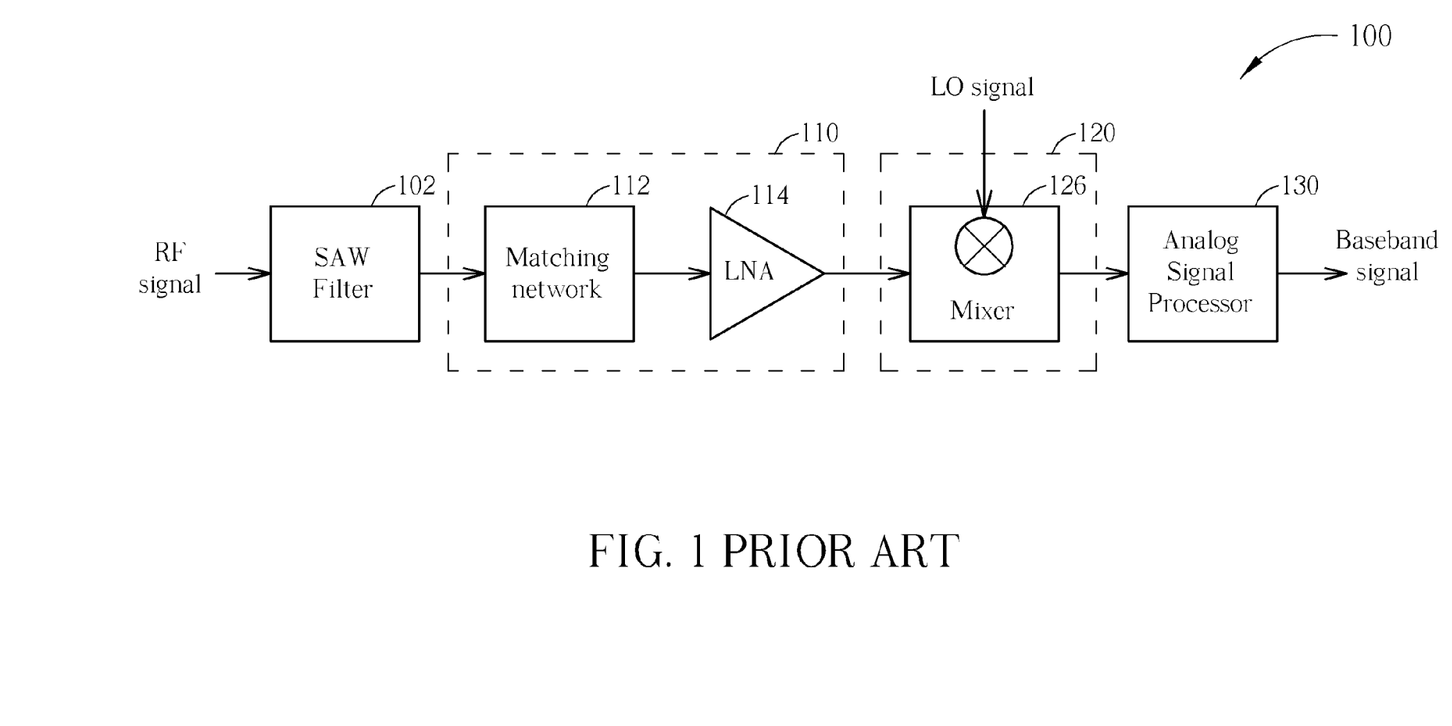
FIG. 1 is a functional diagram illustrating an exemplary prior art receiver for a wireless communication system.

FIG. 1 is a functional diagram illustrating an exemplary prior art receiver 100 for a wireless communication system. The receiver 100 includes a SAW filter 102, an RF signal processor 110, a frequency conversion interface 120, and an analog signal processor 130. The SAW filter 102 is a frequency-selective device which passes in-band part and attenuates out-of-band part of the received RF signal. The RF signal processor 110 includes a matching network 112 for power matching or noise matching and a low noise amplifier (LNA) 114 for signal enhancement. The prior art frequency conversion interface 120 adopts a mixer 126 which operates according to a local oscillator (LO) signal. After signal filtering and amplification, the RF signal is then down-converted to an intermediate frequency signal by the mixer 126. The analog signal processor 130 can thus process the intermediate frequency signal for subsequent applications.

There are several drawbacks associated with the prior art receiver 100. The first is that in-band attenuation tends to make it harder to detect weak signals, creating the need for an even more sensitive receiver after the SAW filter. More importantly, there is currently no economical way to implement SAW filters or their equivalents in the same processes as the active circuits that follow them, which are typically produced using CMOS or BiCMOS processes and either silicon or silicon germanium technologies. The result is that SAW filters significantly increase the cost and consume equally valuable circuit board area in a typical communication device. This problem is further exacerbated by the proliferation of different frequency bands that a communication device has to be compatible with.

SUMMARY OF THE INVENTION

In one aspect, an embodiment of the present invention provides an interference-robust receiver for a wireless communication system comprising a radio frequency (RF) signal processor for providing an RF signal and a frequency conversion interface. The frequency conversion interface comprises a passive mixer for generating an intermediate frequency signal by down-converting an in-band part of the RF signal to a passband of a filter; and down-converting an out-of-band part of the RF signal to a stopband of the filter; and the filter for filtering the intermediate frequency signal with the passband and the stopband.

In another aspect, another embodiment of the present invention further provides an interference-robust receiver for a wireless communication system comprising an RF signal processor for providing an RF signal and a frequency conversion interface. The frequency conversion interface comprises a passive mixer including a first input node and a second input node for receiving the RF signal; a first output node and a second output node for outputting a first intermediate frequency signal; a first switch for selectively connecting the first input node to the first output node according to a first differential local oscillator signal; a second switch for selectively connecting the first input node to the second output node according to a second differential local oscillator signal; a third switch for selectively connecting the second input node to the first output node according to the second differential local oscillator signal; and a fourth switch for selectively connecting the second input node to the second output node according to the first differential local oscillator signal; and a filer for filtering the intermediate frequency signal by passing the intermediate frequency signal associated with an in-band part of the RF signal and blocking the intermediate frequency signal associated with an out-of-band part of the RF signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
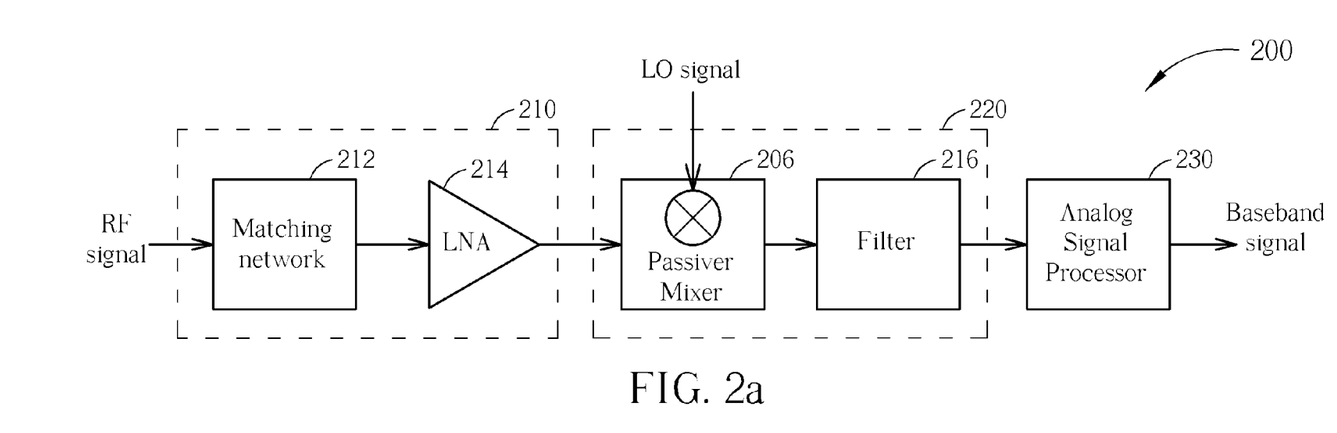
FIGS. 2a and 2b are functional diagrams illustrating an interference-robust receiver for a wireless communication system according to the present invention.
Figure 2B:
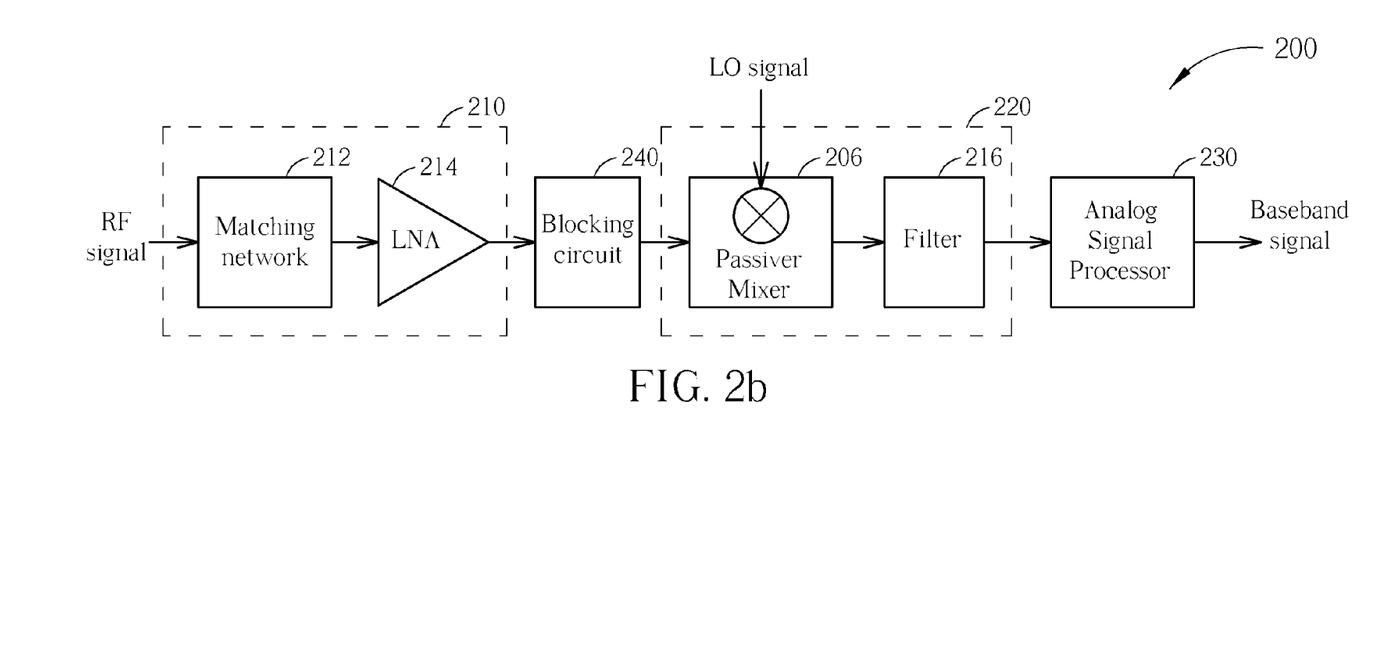

FIGS. 2a and 2b are functional diagrams illustrating an interference-robust receiver 200 for a wireless communication system according to the embodiments of the present invention. The receiver 200 depicted in FIGS. 2a and 2b, each including an RF signal processor 210, a frequency conversion interface 220 and an analog signal processor 230, can receive a wideband RF signal and down-convert the wideband RF signal to a predetermined intermediate frequency. The receiver 200 depicted in FIG. 2b further includes a blocking circuit 240 for direct current (DC) signal isolation between the RF signal processor 210 and the frequency conversion interface 220. The RF signal processor 210 can adopt many configurations, such as using a matching network 212 and an LNA 214 for providing the RF signal to the frequency conversion interface 220. The matching network 212 provides power or noise matching in order to improve power gain or noise figure depending the system requirement in various applications or circuit designs. The LNA 214 then amplifies the RF signal for better driving the frequency conversion interface 220. In the embodiments of the present invention, the LNA 214 can be a pseudo-differential, LNA, a single-ended LNA, a fully differential LNA, or other suitable LNA circuits. If required, the matching network 212 can also provide signal conversion, such as converting a single-ended RF signal into a differential pair RF signal if the LNA 214 adopts differential input ports.

The frequency conversion interface 220 comprises a passive mixer 206 and a filter 216. The passive mixer 206, which operates according to the LO signal, down-converts the RF signal provided by the RF signal processor 210 to a predetermined intermediate frequency, thus obtaining an intermediate frequency signal. Moreover, the in-band part and out-of-band part of the RF signal are down-converted to the passband and the stopband of the filter 216, respectively. In one application, the passband of the filter 216 can be designed to a frequency range centered on the frequency of the LO signal. Yet in other applications, the passive mixer 206 can be arranged so that the in-band part of the RF signal is away from the frequency of the LO signal. That is, depending on design requirements, the in-band part of the RF signal can be within or not within a certain range of frequencies centered on the frequency of the LO signal, not limited by the embodiments.

Meanwhile, the filter 216 provides signal rejection by passing the input signal when the frequency is in its passband and blocking the input signal when the frequency is in its stopband. Since the in-band part and the out-of-band part of the RF signal are respectively down-converted to the passband and the stopband of the filter 216 by the passive mixer 206, substantially only the in-band intermediate frequency signal is transmitted to the analog signal processor 230, thereby preventing the analog signal processor 230 from being saturated by the unwanted jammer intermediate frequency signal (i.e., the down-converted out-of-band RF signal). In other words, the frequency conversion interface 220 is operated as a current driven interface to the RF signal processor 210 for the out-of-band part of the RF signal.

In another aspect, the filter 216 suppresses the voltage swing of the jammer intermediate frequency signal at its input. As a passive device, the passive mixer 206 also up-converts the voltage established at the input of the filter 216. Therefore, as the voltage established at the input of the filter 216 is suppressed by the filter 216, the voltage established at the input of the passive mixer 206 can also be suppressed, thereby preventing the RF signal processor 210 from being saturated by the out-of-band part of the RF signal. The RF signal processor 210 can comprise any type of amplifier (e.g. a transconductance amplifier) to provide an RF signal to the frequency conversion interface 220. In the embodiments, the filter 216 may be a passive filter, which can be consisting of all passive components or comprise passive and active components, operated as a passive device.

Figure 3A:
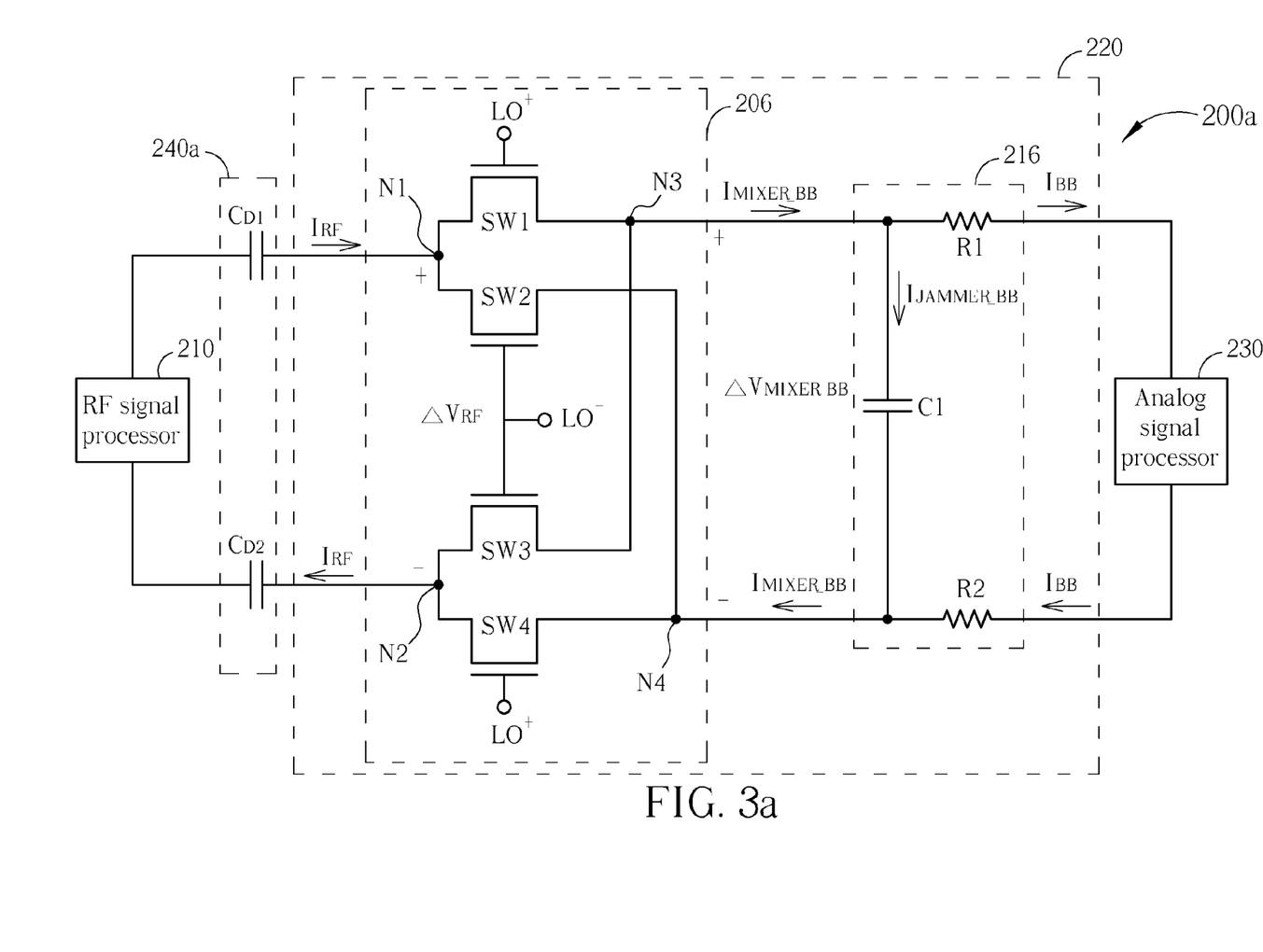
FIGS. 3a, 3b, and 4-5 are circuit diagrams illustrating the embodiments of the receiver in FIG. 2b.
Figure 3B:
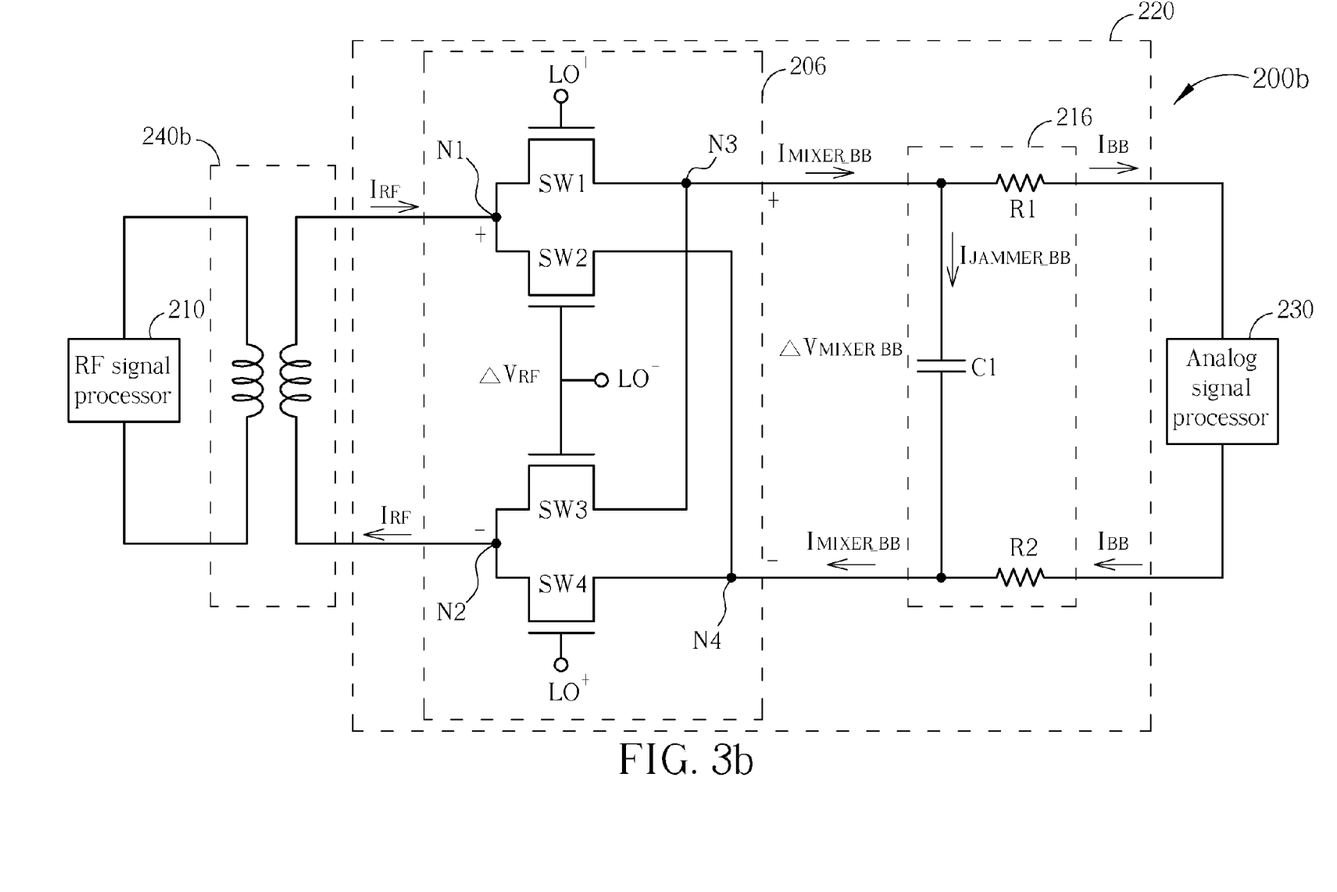

FIGS. 3a, 3b and 4-5 are circuit diagrams illustrating the embodiments of the receiver 200 in FIG. 2b. In the receiver 200a according to the first embodiment of the present invention as depicted in FIG. 3a, the passive mixer 206 includes four switches SW1-SW4, the filter 216 is a resistor-capacitor (RC) type current-input current-output low-pass filter having a capacitor C1 and two resistors R1 and R2, and the blocking circuit 240a includes two capacitors $C_{D1}$ and $C_{D2}$. In the receiver 200b according to the first embodiment of the present invention as depicted in FIG. 3b, the passive mixer 206 includes four switches SW1-SW4, the filter 216 is an RC type current-input current-output low-pass filter having a capacitor C1 and two resistors R1 and R2, and the blocking circuit 240b includes a transformer. The passive mixer 206 receives the RF signal (represented by a current $I_{RF}$ flowing into a first input node N1 and out of a second input node N2) and outputs the intermediate frequency signal (represented by a current $I_{MIXER\_BB}$ flowing out of a first output node N3 and into a second output node N4). In the blocking circuit 240a, the capacitor $C_{D1}$ is disposed between the RF signal processor 210 and the first input node N1, while the capacitor $C_{D2}$ is disposed between the RF signal processor 210 and the second input node N2 for DC isolation. In the blocking circuit 240b, a transformer is provided for DC isolation. The switches SW1-SW4 operate according to a differential local oscillator signal pair LO+ and LO−, wherein the negative differential local oscillator signal LO− has a 180 degree phase shift with respect to the positive differential local oscillator signal LO+: the switch SW1 selectively connects/disconnects the first input node N1 to the first output node N3 depending on the positive local oscillator signal LO+, the switch SW2 selectively connects/disconnects the first input node N1 to the second output node N4 depending on the negative local oscillator signal LO−, the switch SW3 selectively connects/disconnects the second input node N2 to the first output node N3 depending on the negative local oscillator signal LO−, the switch SW4 selectively connects/disconnects the second input node N2 to the second output node N4 depending on the positive local oscillator signal LO+. Therefore, the switches SW1-SW4 can mix the RF signal $I_{RF}$ with the differential local oscillator signal pair LO+ and LO−. For example, the RF signal $I_{RF}$ having a frequency of $(f_{LO}+\Delta f)$ is down-converted to the intermediate frequency signal $I_{MIXER\_BB}$ having a frequency of $\Delta f$ by the passive mixer 206. Thus, the in-band RF signal at $(f_{LO}+\Delta f_1)$ and the out-of-band RF signal at $(f_{LO}+\Delta f_2)$ both are down-converted to $\Delta f_1$ to $\Delta f_2$ respectively. The down-converted in-band and out-of-band RF signal are denoted by $I_{BB}$ and $I_{JAMMER\_BB}$, respectively.

In the case of $\Delta f_1 < \Delta f_2$, the corner frequency of the low-pass filter $(1/4\pi R_1 C_1)$ should be designed between $\Delta f_1$ and $\Delta f_2$ such that the down-converted in-band RF signal $I_{BB}$ is in the passband of the low-pass filter 216 and is outputted to the analog signal processor 230 via the resistors R1 and R2, while the down-converted out-of-band RF signal $I_{JAMMER\_BB}$ is in the stopband of the low-pass filter 216 and is filtered by the capacitor C1, thereby preventing the analog signal processor 230 from being saturated by the jammer intermediate frequency signal $I_{JAMMER\_BB}$.

Meanwhile, the intermediate-frequency voltage swing $\Delta V_{MIXER\_BB}$ is irresistibly established between the nodes N3 and N4. As a passive device, the passive mixer 206 simultaneously upconverts the intermediate-frequency voltage swing $\Delta V_{MIXER\_BB}$ to an RF voltage $\Delta V_{RF}$ between the nodes N1 and N2. If the corner frequency of the low-pass filter 216 is much smaller than $\Delta f_2$ (e.g. 10 times), the intermediate-frequency voltage swing $\Delta V_{MIXER\_BB}$ at $\Delta f_2$ is approximately equal to $I_{JAMMER\_BB}/2\pi \Delta f_2 C_1$. Therefore, the intermediate frequency voltage swing $\Delta V_{MIXER\_BB}$ due to the out-of-band RF signal, which is established between the nodes N3 and N4, can be suppressed by increasing the capacitance of the capacitor $C_1$ in the filter 216, while the RF voltage $\Delta V_{RF}$ established between the nodes N1 and N2 can also be suppressed with the same ratio, thereby preventing the RF signal processor 210 from being saturated by the RF voltage $\Delta V_{RF}$ resulted from the out-of-band RF signal.

Figure 4:
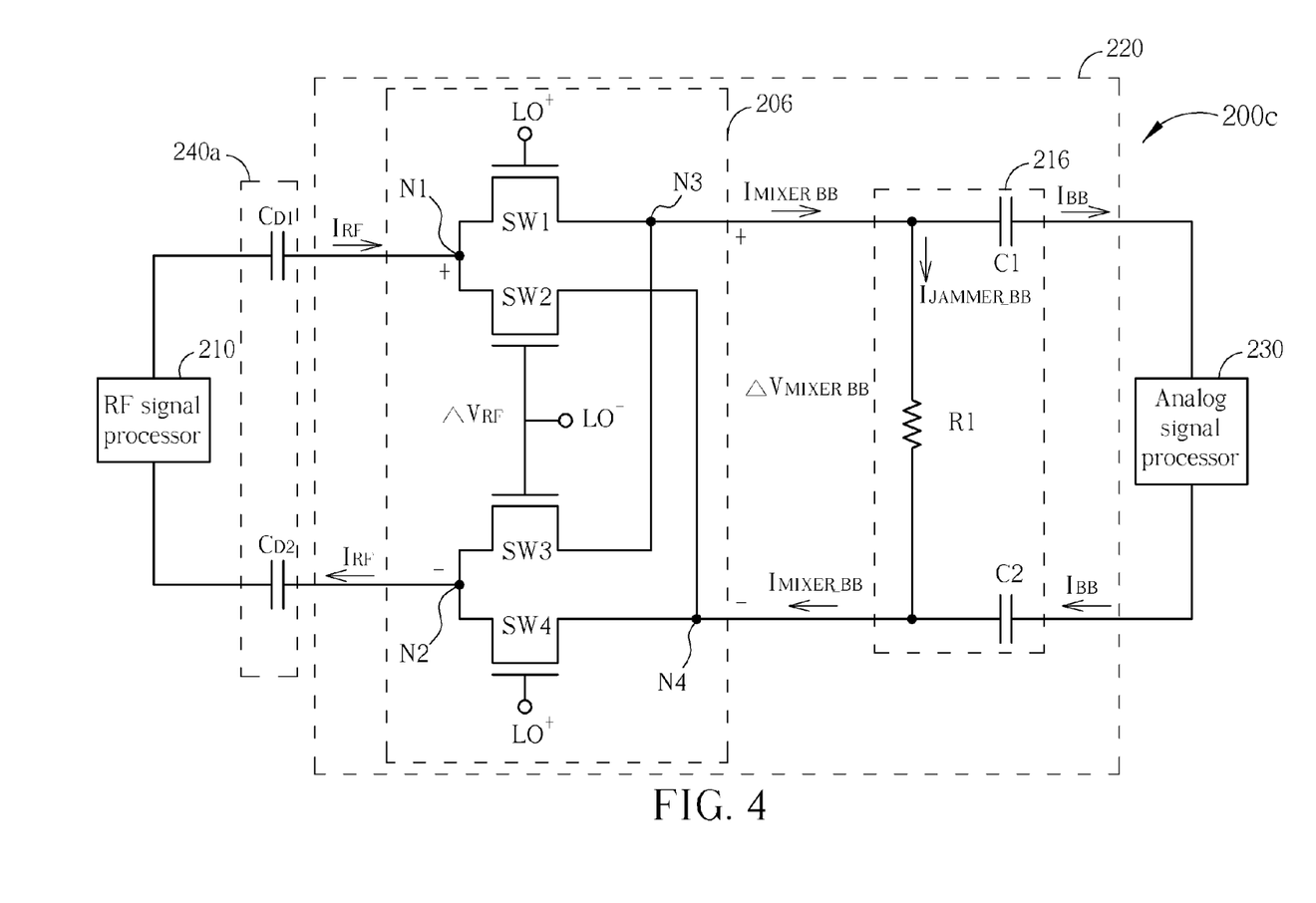

In the receiver 200c according to the second embodiment of the present invention as depicted in FIG. 4, the filter 216 is a current-in current-out high-pass RC filter having a resistor R1 and two capacitors C1 and C2. In this example, $\Delta f_1$ is larger than $\Delta f_2$, so the frequency corners of the high-pass filter ($1/\pi R_1 C_1$ and $1/\pi R_1 C_2$) should be designed between $\Delta f_1$ and $\Delta f_2$ such that the down-converted in-band RF signal $I_{BB}$ is in the passband of the high-pass filter 216 and is outputted to the analog signal processor 230 via the capacitors C1 and C2, while the down-converted out-of-band RF signal $I_{JAMMER\_BB}$ is in the stopband of the high-pass filter 216 and is filtered by the resistor R1, thereby preventing the analog signal processor 230 from being saturated by the jammer intermediate frequency signal $I_{JAMMER\_BB}$.

If the corner frequency of the high-pass filter 216 is much larger than $\Delta f_2$ (e.g. 10 times), the intermediate-frequency voltage swing $\Delta V_{MIXER\_BB}$ at $\Delta f_2$ is approximately equal to $I_{JAMMER\_BB} * R_1$. Therefore, the intermediate frequency voltage swing $\Delta V_{MIXER\_BB}$ due to the out-of-band RF signal, which is established between the nodes N3 and N4, can be suppressed by decreasing the resistance of the resistor $R_1$ in the filter 216, while the RF voltage $\Delta V_{RF}$ established between the nodes N1 and N2 can also be suppressed with the same ratio, thereby preventing the RF signal processor 210 from being saturated by the RF voltage $\Delta V_{RF}$ resulted from the out-of-band RF signal. Meanwhile, the receiver 200c can also adopt the blocking circuit 240b as depicted in FIG. 3b.

Figure 5:
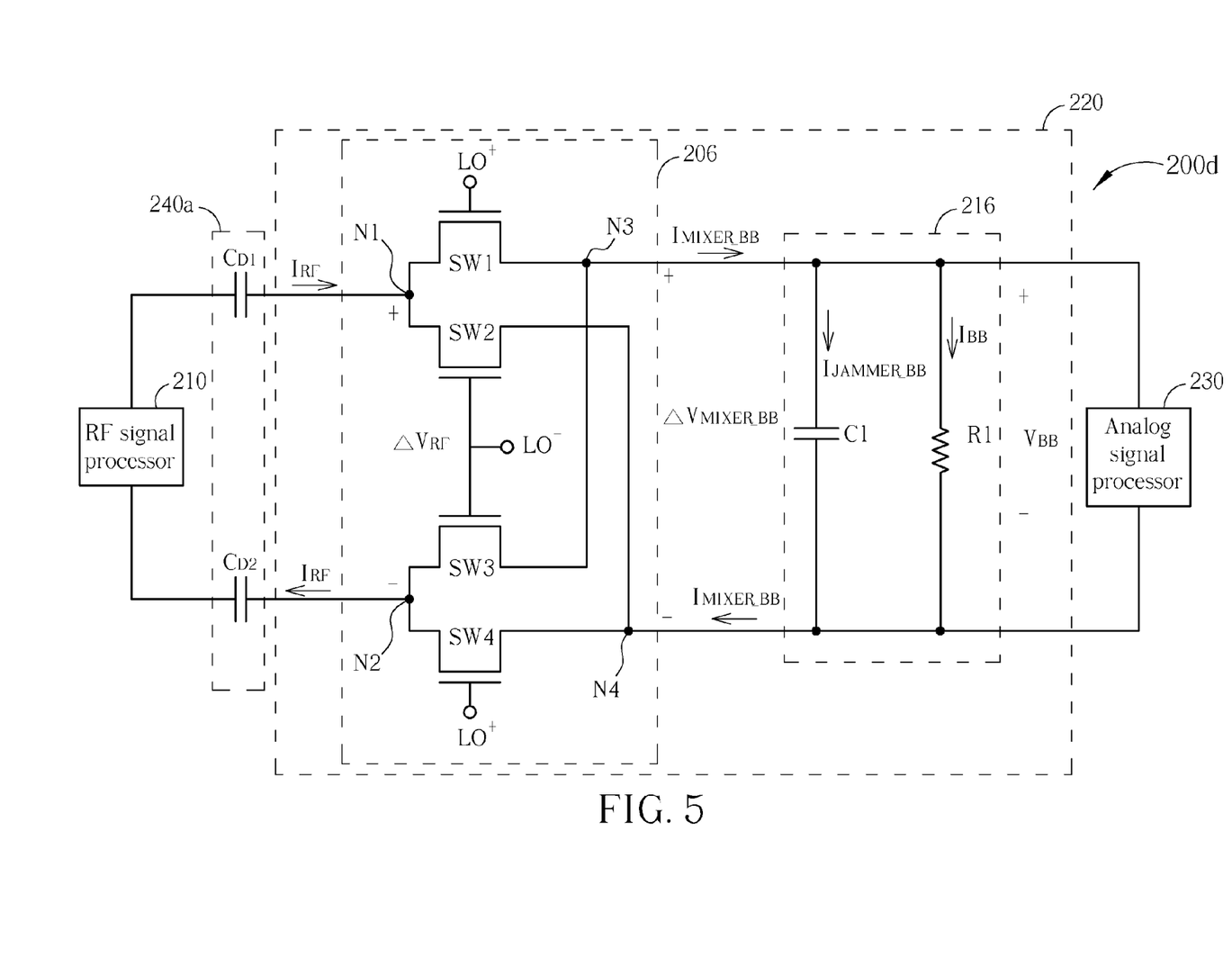

In the receiver 200d according to the third embodiment of the present invention as depicted in FIG. 5, the filter 216 is a current-in voltage-out low-pass RC filter having a resistor R1 and a capacitor C1. In the case of $\Delta f_1 < \Delta f_2$, the corner frequency of the low-pass filter ($1/2\pi R_1 C_1$) should be designed between $\Delta f_1$ and $\Delta f_2$ such that the down-converted in-band RF signal $I_{BB}$ is in the passband of the low-pass filter 216. Thus, the in-band intermediate-frequency voltage swing between the nodes N3 and N4, outputted to the analog signal processor 230, is approximately equal to $I_{BB} * R_1$. In another aspect, the down-converted out-of-band RF signal $I_{JAMMER\_BB}$ is in the stopband of the low-pass filter 216 so the out-of-band intermediate-frequency voltage between N3 and N4 is approximately equal to $I_{JAMMER\_BB}/2\pi \Delta f_2 C_1$. Therefore, the intermediate-frequency voltage swing $\Delta V_{MIXER\_BB}$ at $\Delta f_2$ due to the out-of-band RF signal can be suppressed by increasing the capacitance of the capacitor C1 in the filter 216. In this example, suppressing the intermediate-frequency voltage swing $\Delta V_{MIXER\_BB}$ at $\Delta f_2$ due to the out-of-band RF signal can prevent the analog signal processor 230 from being saturated. As in the previous two examples, the voltage swing $\Delta V_{RF}$ established between the nodes N1 and N2 can also be suppressed with the same ratio, thereby preventing the RF signal processor 210 from being saturated by the RF voltage $\Delta V_{RF}$ resulted from the out-of-band RF signal. Meanwhile, the receiver 200d can also adopt the blocking circuit 240b as depicted in FIG. 3b.

Figure 6A:
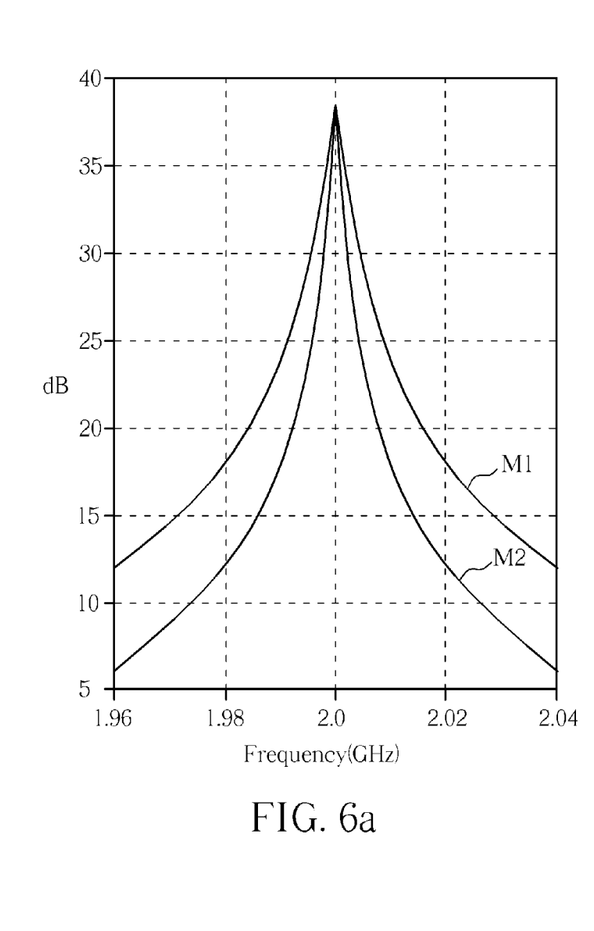
FIGS. 6a and 6b are diagrams illustrating the operation of the frequency conversion interface according to the present invention.
Figure 6B:
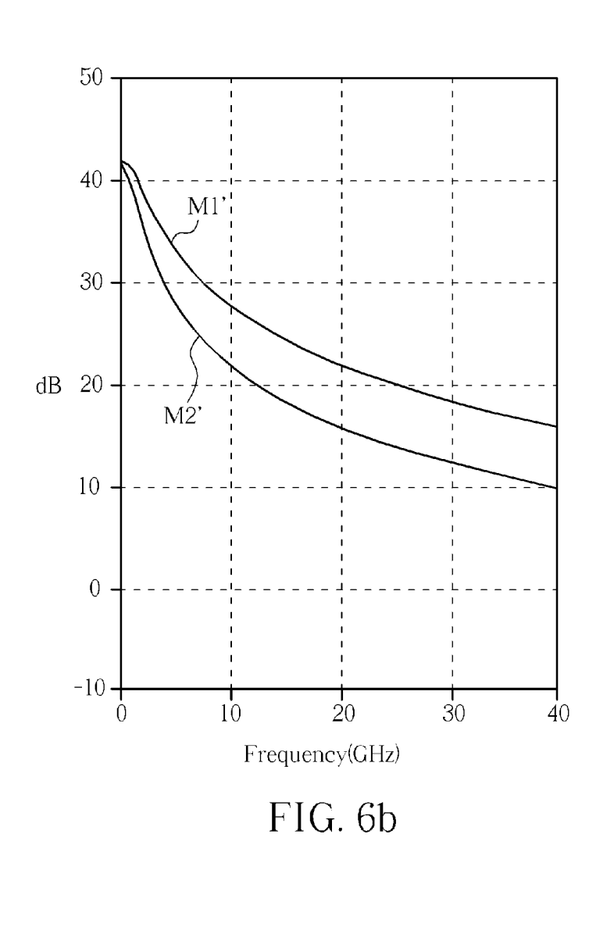

FIGS. 6a and 6b are diagrams illustrating the operation of the frequency conversion interface 220 according to the present invention. FIG. 6a shows the input impedance of the passive mixer 206, while FIG. 6b shows the frequency response of the filter 216. Curves M1 and M1' represent the results when the filter 216 provides an equivalent resistance of 100 ohm and an equivalent capacitance of 400 pF, while Curves M2 and M2' represent the results when the filter 216 provides an equivalent resistance of 100 ohm and an equivalent capacitance of 800 pF. As can be seen in FIGS. 6a and 6b, the out-of-band rejection ratio, or equivalently, the out-of-band voltage swing suppression, can be determined by properly selecting the values for the capacitor(s) and the resistor(s) of the filter 216.

Figure 7:
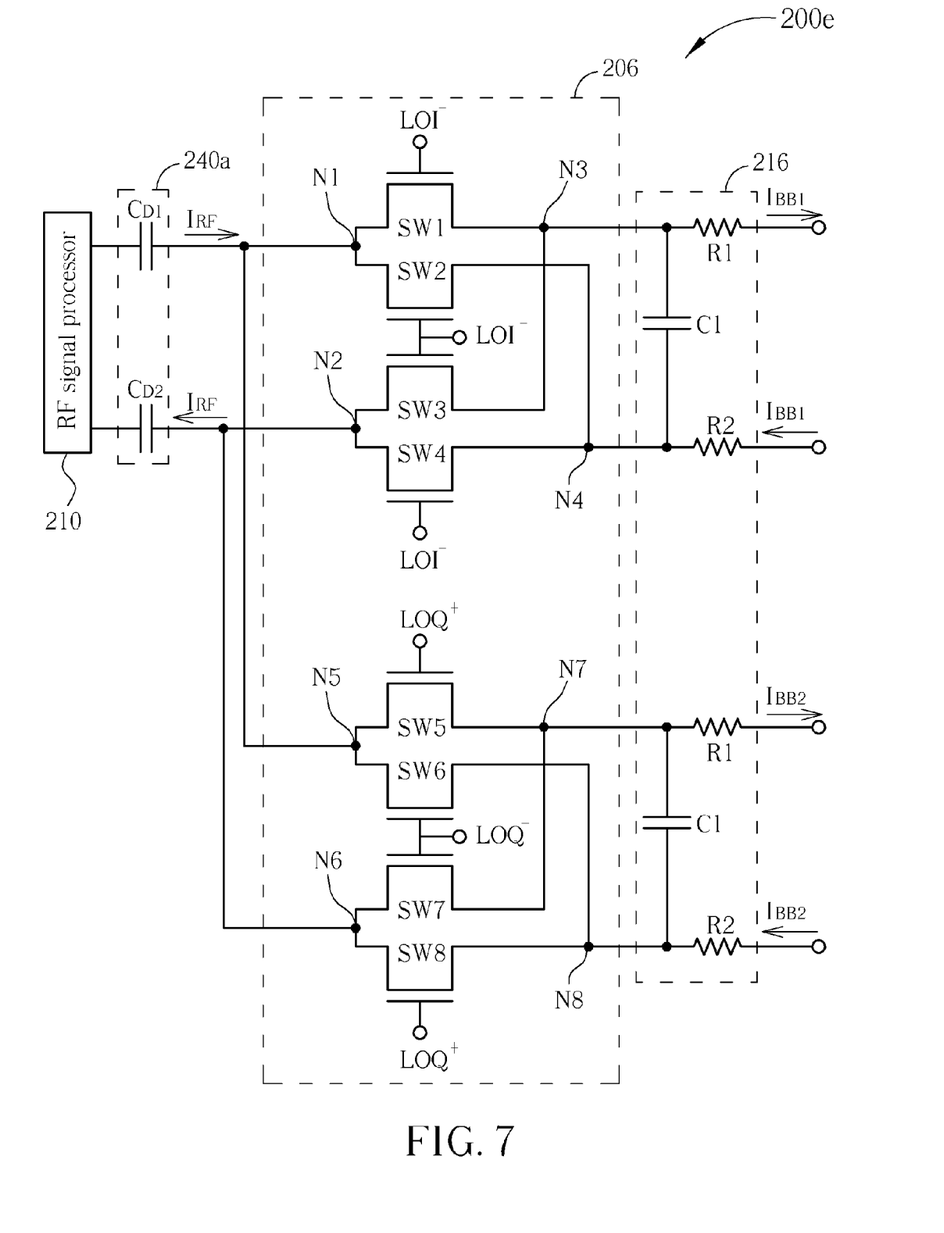
FIG. 7 is a circuit diagram illustrating another embodiment of the receiver depicted in FIG. 2b.

FIG. 7 is a circuit diagram illustrating a fifth embodiment of the receiver 200 depicted in FIG. 2b. In the receiver 200e according to the fifth embodiment of the present invention, the passive mixer 206 includes eight switches SW1-SW8 and the blocking circuit 240a includes two capacitors $C_{D1}$ and $C_{D2}$. The passive mixer 206 receives the RF signal (represented by a current $I_{RF}$ flowing into and out of the passive mixer) at a first input node N1 and a second input node N2, as well as at a third input node N5 and a fourth input node N6. Also, the passive mixer 206 outputs the intermediate frequency signal at a first output node N3 and a second output node N4, as well as at a third output node N7 and a fourth output node N8. The capacitor $C_{D1}$ provides DC isolation between the RF signal processor 210 and the first input node N1, as well as between the RF signal processor 210 and the third input node N5. The capacitor $C_{D2}$ provides DC isolation between the RF signal processor 210 and the second input node N2, as well as between the RF signal processor 210 and the fourth input node N6. The receiver 200e can also adopt the blocking circuit 240b as depicted in FIG. 3b. The switches SW1-SW4 operate according to a differential local oscillator signal pair LOI+ and LOI−, while the switches SW5-SW8 operate according to a differential local oscillator signal pair LOQ+ and LOQ−. In other words, the switches SW1-SW8 selectively connect/disconnect the corresponding input nodes to the corresponding output nodes depending on the corresponding local oscillator signals. Therefore, the switches SW1-SW4 can mix the RF signal $I_{RF}$ with the differential local oscillator signal pair LOI+ and LOI−, while the switches SW5-SW8 can mix the RF signal $I_{RF}$ with the differential local oscillator signal pair LOQ+ and LOQ−.

In the receiver 200e, the passive mixer 206 operate according to quadrature LO signals wherein the differential local oscillator signal LOI− has a 180 degree phase shift with respect to the differential local oscillator signal LOI+, the differential local oscillator signal LOQ+ has a 90 degree phase shift with respect to the differential local oscillator signal LOI+, the differential local oscillator signal LOQ− has a 270 degree phase shift with respect to the differential local oscillator signal LOI+. The filter 216 can include two RC filters each having a capacitor C1 and two resistors R1 and R2 (as depicted in FIG. 7), or having other configurations (such as those depicted in FIGS. 4 and 5). The out-of-band rejection ratio can be determined by properly selecting the values for the capacitor(s) and the resistor(s) of the filter 216.

Figure 8A:
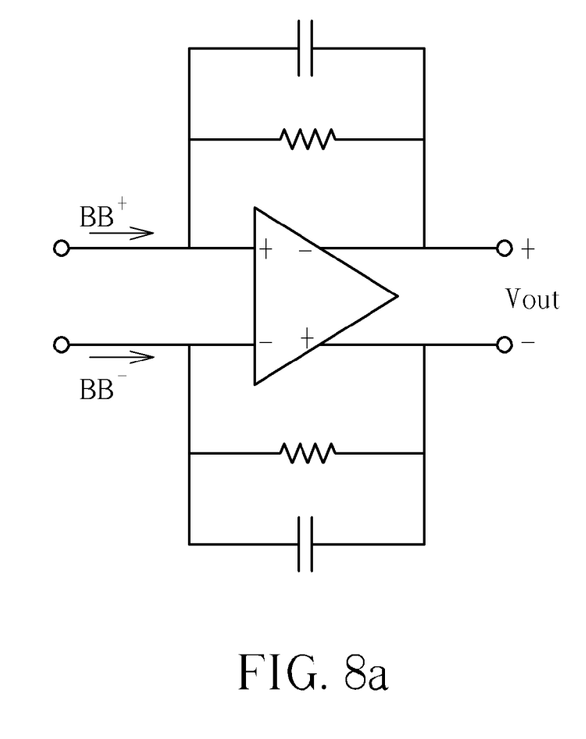
FIGS. 8a and 8b are circuit diagrams of the analog signal processor according to the embodiments of the present invention.
Figure 8B:
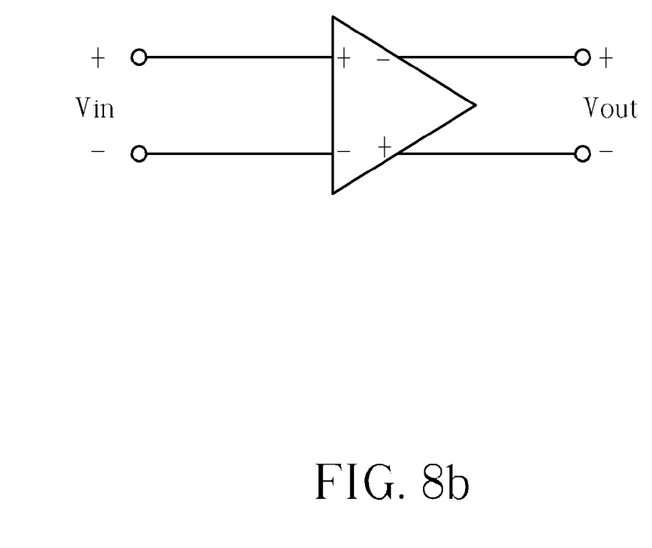

FIGS. 8a and 8b are circuit diagrams illustrating the analog signal processor 230 according to the embodiments of the present invention. For the current-in current-out RC filters depicted in FIGS. 3a, 3b and 4, the analog signal processor 230 can be implemented by a transimpedance amplifier comprising an operational amplifier with RC feedback (as depicted in FIG. 8a). For the current-in voltage-out RC filter depicted in FIG. 5, the analog signal processor 230 can be implemented by a voltage amplifier (as depicted in FIG. 8b).

The embodiments of the present invention can also use other configurations of RC filters for providing low-pass, band-pass or high-pass frequency responses, as well as other types of analog signal processors according to the requirement of the wireless communication system. The configurations shown in FIGS. 3-5 and 8a-8b are merely for illustrative purpose, and do not limit the scope of the present invention.

In the embodiments of the present invention, the interference-robust receiver for a wireless communication system can be implemented without a SAW filter or other similar components which are expensive to fabricate and consume large space. Using a passive mixer followed by a proper filter, the frequency conversion interface of the embodiments can suppress the RF voltage swing resulted from the out-of-band RF signal at its input and suppress the intermediate frequency out-of-band signal swing at its output. Therefore, both analog and RF signal processors, which are disposed after and before the frequency conversion interface, respectively, can be protected from being saturated by the received out-of-band RF signal. Since both analog and RF signal processors can function normally in the presence of strong out-of-band blocking signals, the weak RF signals can thus be successfully detected by the interference-robust receiver for subsequent applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interference-robust receiver for a wireless communication system comprising:
    a radio frequency (RF) signal processor for providing an RF signal;
    a frequency conversion interface comprising:
        a passive mixer for generating an intermediate frequency signal by down-converting an in-band part of the RF signal to a passband of a filter; and down-converting an out-of-band part of the RF signal to a stopband of the filter; and
        the filter for filtering the intermediate frequency signal with the passband and the stopband, wherein the filter is a passive filter, and a corner frequency setting of the filter depends on a frequency of a down-converted in-band part generated from down-converting the in-band part received by the interference-robust receiver and a frequency of a down-converted out-of-band part generated from down-converting the out-of-band part received by the interference-robust receiver; and
    an analog signal processor for processing the filtered intermediate frequency signal, wherein the frequency conversion interface is arranged to reject the down-converted out-of-band part of the RF signal so as to prevent the analog signal processor from being saturated by the generated intermediate frequency signal.

2. The interference-robust receiver of claim 1 wherein the passive mixer is further arranged to up-convert an intermediate frequency voltage established at an input of the filter into an RF band voltage at an input of the passive mixer.

3. The interference-robust receiver of claim 2 wherein an in-band and out-of-band impedance ratio at the input of the passive mixer is substantially equal to a rejection ratio of the filter.

4. The interference-robust receiver of claim 1 wherein the frequency conversion interface is operated as a current driven interface to the RF signal processor for the out-of-band part of the RF signal.

5. The interference-robust receiver of claim 4 wherein the frequency conversion interface is arranged to reduce a voltage swing of the out-of-band part in the RF signal so as to prevent the RF signal processor from being saturated by the out-of-band part of the RF signal.

6. The interference-robust receiver of claim 1 further comprising a blocking circuit, coupled between the RF signal processor and the frequency conversion interface, for direct current (DC) blocking of the RF signal.

7. An interference-robust receiver for a wireless communication system comprising:
    an RF signal processor for providing an RF signal;
    a frequency conversion interface comprising:
        a passive mixer including:
            a first input node and a second input node for receiving the RF signal;
            a first output node and a second output node for outputting a first intermediate frequency signal;
            a first switch for selectively connecting the first input node to the first output node according to a first differential local oscillator signal;
            a second switch for selectively connecting the first input node to the second output node according to a second differential local oscillator signal;
            a third switch for selectively connecting the second input node to the first output node according to the second differential local oscillator signal; and
            a fourth switch for selectively connecting the second input node to the second output node according to the first differential local oscillator signal; and
        a filer for filtering an intermediate frequency signal by passing the intermediate frequency signal associated with an in-band part of the RF signal and blocking the intermediate frequency signal associated with an out-of-band part of the RF signal, wherein the filter is a passive filter, and a corner frequency setting of the filter depends on a frequency of a down-converted in-band part generated from down-converting the in-band part received by the interference-robust receiver and a frequency of a down-converted out-of-band part generated from down-converting the out-of-band part received by the interference-robust receiver; and
    an analog signal processor for processing the filtered intermediate frequency signal, wherein the frequency conversion interface is arranged to reject the down-converted out-of-band part of the RF signal so as to prevent the analog signal processor from being saturated by the generated intermediate frequency signal.

8. The interference-robust receiver of claim 7 further comprising:
    a first capacitor disposed between the RF signal processor and the first input node; and
    a second capacitor disposed between the RF signal processor and the second input node.

9. The interference-robust receiver of claim 7 wherein the second differential local oscillator signal has a 180 degree phase shift with respect to the first differential local oscillator signal.

10. The interference-robust receiver of claim 7 wherein the passive mixer further comprises:
    a third input node and a fourth input node for receiving the RF signal;
    a third output node and a fourth output node for outputting a second intermediate frequency signal;
    a fifth switch for selectively connecting the third input node to the third output node according to a third differential local oscillator signal;
    a sixth switch for selectively connecting the third input node to the fourth output node according to a fourth differential local oscillator signal;
    a seventh switch for selectively connecting the fourth input node to the third output node according to the fourth differential local oscillator signal; and
    an eighth switch for selectively connecting the fourth input node to the fourth output node according to the third differential local oscillator signal.

11. The interference-robust receiver of claim 10 further comprising:
   a first capacitor disposed between the RF signal processor and the third input node; and
   a second capacitor disposed between the RF signal processor and the fourth input node.

12. The interference-robust receiver of claim 10 wherein the second differential local oscillator signal has a 180 degree phase shift with respect to the first differential local oscillator signal, and the third differential local oscillator signal has a 90 degree phase shift with respect to the first differential local oscillator signal.

13. The interference-robust receiver of claim 7 wherein the in-band part of the RF signal is within a certain range of frequencies centered on a frequency of the first and second differential local oscillator signals.

14. The interference-robust receiver of claim 7 wherein the filter is a current-input current-output filter or a current-input voltage-output filter.

15. The interference-robust receiver of claim 7 wherein the RF signal processor comprises a low noise amplifier (LNA) for amplifying the RF signal.

16. The interference-robust receiver of claim 7 wherein the RF signal processor comprises a matching network for power matching or noise matching.

17. The receiver of claim 7 wherein the analog signal processor is a transimpedance amplifier while the filter is a current-output filter, or the analog signal processor is a voltage amplifier while the filter is a voltage-output filter.

* * * * *